(12) United States Patent
Krupnik et al.

(10) Patent No.: US 12,186,654 B2
(45) Date of Patent: Jan. 7, 2025

(54) WIRELESS DANCE MAT, BASE DEVICE AND METHOD OF OPERATION

(71) Applicant: L-TEK SPOLKA Z OGRANICZONA ODPOWIEDZIALNOSCIA, Wadowice (PL)

(72) Inventors: Katarzyna Krupnik, Wadowice (PL); Tomasz Krupnik, Wadowice (PL); Piotr Chmiel, Rybna (PL)

(73) Assignee: L-TEK SPOLKA Z OGRANICZONA ODPOWIEDZIALNOSCIA, Wadowice (PL)

( * ) Notice: Subject to any disclaimer, the term of this patent is extended or adjusted under 35 U.S.C. 154(b) by 291 days.

(21) Appl. No.: 17/942,253

(22) Filed: Sep. 12, 2022

(65) Prior Publication Data
US 2023/0082988 A1 Mar. 16, 2023

(30) Foreign Application Priority Data
Sep. 13, 2021 (PL) .......................... 438937

(51) Int. Cl.
| A63F 13/235 | (2014.01) |
| A63F 13/214 | (2014.01) |
| A63F 13/218 | (2014.01) |
| A63F 13/814 | (2014.01) |
| A63F 13/816 | (2014.01) |

(52) U.S. Cl.
CPC .......... *A63F 13/235* (2014.09); *A63F 13/214* (2014.09); *A63F 13/218* (2014.09); *A63F 13/814* (2014.09); *A63F 13/816* (2014.09); *A63F 2300/1031* (2013.01); *A63F 2300/1068* (2013.01); *A63F 2300/8005* (2013.01); *A63F 2300/8047* (2013.01)

(58) Field of Classification Search
CPC .... A63F 13/235; A63F 13/214; A63F 13/218; A63F 13/814; A63F 13/816; A63F 2300/1031; A63F 2300/1068; A63F 2300/8005; A63F 2300/8047
USPC ...................................................... 463/7, 36
See application file for complete search history.

(56) References Cited

U.S. PATENT DOCUMENTS

| 6,227,968 B1 | 5/2001 | Suzuki et al. |
| 6,410,835 B2 | 6/2002 | Suzuki et al. |

(Continued)

*Primary Examiner* — Allen Chan
(74) *Attorney, Agent, or Firm* — Ralph E. Jocke; WALKER & JOCKE

(57) ABSTRACT

Exemplary arrangements relate to a system that includes at least one wireless dance mat and a base device, as well as a method of operation and communication which provides for rapid and accurate signals indicative of the state of a plurality of pressure sensors in the dance mat. Each pressure sensor is configured to sense pressure resulting from person contact with the dance mat. Transmission controller circuitry is in operative connection with the pressure sensors and a wireless transceiver. The wireless transceiver is operative to transmit wireless signals on a uniform periodic basis and in a sequential order. The exemplary signals each include data corresponding to pressure sensed by each of the pressure sensors at a time of signal transmission, and a position of the respective signal in the sequential order. Data included in the signals received by the base device is usable to determine conditions in which signals are not received and/or signal data has not been accurately received.

24 Claims, 4 Drawing Sheets

(56) References Cited

U.S. PATENT DOCUMENTS

| | | | | |
|---|---|---|---|---|
| 7,128,649 B2 * | 10/2006 | Nobe | ................... | A63F 13/814 |
| | | | | 463/31 |
| 2008/0004111 A1 * | 1/2008 | Prather | ................ | A63F 13/245 |
| | | | | 463/36 |
| 2008/0039199 A1 * | 2/2008 | Baer | ................... | A63F 13/213 |
| | | | | 463/36 |
| 2009/0221372 A1 * | 9/2009 | Casey | .................. | A63F 13/211 |
| | | | | 463/36 |

* cited by examiner

WIRELESS DANCE MAT, BASE DEVICE AND METHOD OF OPERATION

TECHNICAL FIELD

Exemplary arrangements relate to a wireless dance mat, a base device and methods of operation and communication between the wireless dance mat and the base device. The exemplary devices may be usable in physical therapy, training, sports and rehabilitation activities, in dance and music related activities and in entertainment and game play.

BACKGROUND

Devices and systems that monitor the movement of an individual's feet may be useful in a number of different types of activities. Systems which monitor and detect a person's foot movement in response to instructions or external prompts may be useful for improving reaction times, muscle tone, physical dexterity, fitness and overall health and well-being. Such devices and systems may also be useful in providing music and dance therapies. Such devices and systems may also be useful in providing entertainment activities and in different types of physical and musical game scenarios.

Gaming controllers, including wireless gaming controllers may provide the means for control of the gameplay of certain computer games. In addition to controllers which are manipulatable by a user, systems are known in which cameras, including cameras that are operable as depth sensors, recognize a user's movements and utilize the detected movements in the presentation of outputs produced through operation of a controller.

An example may include devices for dance training and games that provide for the player making dance movements in accordance with a tempo that corresponds to rhythm of music that may be audibly perceived by the user, and/or in accordance with instructions provided to a user, and while maintaining an appropriate reaction time. Of course it should be noted that not all dance games include determining user reaction time in response to signals or instructions that are presented to a user. In some arrangements the approaches are different and the reaction times of the user may be considerably extended. By way of example, instead of measuring whether the user is making movements at a rate consistent with the tempo of music being played, there is an analysis of whether a user has made the right combination of movements with the controller, or movements determined responsive to image data captured by at least one camera. Physical activity, combined with listening to music, may increase the user's benefits from utilizing such systems.

U.S. Pat. Nos. 6,227,968 and 6,410,835, the disclosures of each of which are incorporated herein by reference in their entirety, and which also correspond to patent document EP 0974382B1, disclose an entertainment system in which rhythm sensations can be represented in time to the music by utilization of the whole body and creating an impression of power and rhythm. Stepping position indication data that is set by a rhythm setting section is read from a stepping position indication data memory and the content of stepping position instructions is scrolled and displayed on a monitor by a scroll display control section, thereby performing the stepping position and stepping operation timing instructions. The fact that the player has stepped on a base section in accordance with the monitor content being displayed, is detected by cable switches and the detection is input by a stepping operation monitor section. A score proportional to a time deviation is calculated by an amount of deviation detection totalizing section, and then an evaluation is performed by a rhythm setting section. Then, in accordance with the evaluation result, the next stepping position indication data is set.

A key issue related of systems of the types shown in the incorporated disclosures is the measurement of the user's reaction time that affects the evaluation and score achieved by the user in the activity or game. Some solutions may utilize wired connections to provide minimum time delays associated with the processing of information about the fact that the user has made a step. In addition to the measurement of the user's reaction time, it can be problematic to determine on the one hand, appropriate synchronization of the music that is audible by the user, and an image presented by the devices, and on the other hand, the instructions and commands for the user, and the rate at which the user's response is read (the read rate of the user reaction measurement). Some audio/video devices provide image and sound synchronization with an accuracy of only 50 to 60 ms. All this together may provide drawbacks in systems in which it is essential to detect the body movements at the right pace and with a sufficiently short delay.

For these and other reasons existing arrangements of devices and systems which provide output instructions and/or audible prompts in the form of music or other outputs, and which detect user foot movement in response thereto, may benefit from improvements.

SUMMARY

Exemplary arrangements provide signals indicative of user foot movement in a manner that enables analysis of user response times to or user coordination with user perceivable instructions or stimulus. Such user foot movements, regardless of the purpose associated with making the movements shall be referred to herein as dance. Exemplary arrangements may include one or more dance mats which operate to detect and provide signals indicative of operative contact with the mat by the foot of a person. Such signals are provided in a manner that enables achievement of accuracy in the detection and measurement of such contact, and corresponding foot movement such that a user's coordination and reaction time can be determined in response to user perceived instructions or outputs.

An exemplary arrangement provides benefits by providing a system supporting a plurality of wireless dance mats that impose a strict time regime when transmitting data on users' dance movements which are alternatively referred to herein as steps, which allows for accurate measurement of the user reaction times with regard to instructions or a tempo which corresponds to the rhythm of music that is audible to users. At the same time, a method of communication according to an exemplary arrangement enables the system to observe the required time regimes for communications, maintain high reliability of communication with a minimum amount of transmitted information, and to provide high resistance to interference with communications. Also the exemplary arrangement provides broadcasting of signals to dance mats and other devices that are usable to synchronize outputs and operational aspects of devices, such as lights or light organs, and enables cooperation with other wireless devices, thus creating a coordinated entertainment system.

The exemplary wireless dance mat includes at least two (or more) pressure sensors, sound and light signaling circuitry, user input devices such as control buttons, and an input module which provides a signal interface with the mat pressure sensors. The input module provides an interface that delivers signals indicative of pressure sensed by the pressure sensors which corresponds to the state of the pressure sensors. The exemplary dance mat further includes circuitry including wireless transmission radio module circuitry that operates as a transceiver and an antenna. The exemplary dance mat further includes transmission controller circuitry and a rechargeable battery. The wireless transmission radio module circuitry and the transmission controller circuitry comprise a transceiver configured for wireless communication with a base device.

The transmission controller circuitry that is operatively connected to the wireless transmission radio module circuitry is configured to receive and determine data obtained from at least two pressure sensors via the input module of the mat sensors that is indicative of at least a level of pressure applied to a corresponding sensing area of the dance mat. The exemplary transmission controller circuitry is configured to add, to the transferred data in transmitted signals from the dance mat, additional information that enables the integrity of the transferred data to be verified by the base device that receives the transmitted signals, taking into consideration what should be understood as a set permissible delay value for the transmission of data concerning an event, which event corresponds to a detected change in the state of at least one pressure sensor caused by pressure applied as a result of person contact in a sensing area of the dance mat. In exemplary arrangements the transmission controller circuitry is operative to cause the transceiver to transmit wireless signals from the dance mat on a uniform periodic time basis and in a sequential order. The exemplary transmitted signals each include data corresponding to pressure sensed by each of the pressure sensors at the time of signal transmission by the dance mat, as well as data corresponding to a position of the respective signal in the sequential order of the plurality of signals that is transmitted by the dance mat. In exemplary arrangements data on the occurrence of pressure applied on a particular pressure sensor is transmitted virtually immediately through a wireless channel that is configured through pairing of the wireless dance mat and the base device, which eliminates the delays associated with accessing and obtaining the data from the signals that are transmitted on the channel.

In exemplary arrangements the transmission controller circuitry includes a computing unit including at least one processor, a memory comprising an event buffer and an operating memory, a timer, and sequential module circuitry that are operatively connected through at least one data bus. The sequential module circuitry operates to generate the sequential order data and verification value data included in the transmitted signals that enables the base unit to determine whether or not the received data signals and included data contains gaps concerning whether each pressure sensor has detected pressure at the time the corresponding signal is transmitted.

In the exemplary arrangement the transmission controller circuitry is configured to include data in consecutive transmitted signals that corresponds to sequential consecutive natural numbers that are generated responsive to the sequential module circuitry. This allows the base device circuitry to determine if any signals are not received from the dance mat and the amount of lost data.

In exemplary arrangements the transmission controller circuitry of the dance mat is configured to determine checksums, and to generate a cyclic redundancy code (CRC) for each transmitted signal through operation of the sequential module circuitry. This allows errors in the received signals and data to be determined by the base device. Of course it should be understood that exemplary arrangements may also generate other types of verification values that are usable by the receiving device to determine that the signal and/or data that is included in or with the signal has accurately been received by the receiving device.

The exemplary base device for the system of wireless communication with the at least one wireless dance mat includes sound and light signaling circuitry, input devices such as control buttons, and a visual display or other output devices. The exemplary base device includes dedicated communication interface circuitry for operatively communicating with master control device circuitry including at least one processor, and including at least one transceiver. The at least one transceiver of the base device is configured for communication with the wireless dance mats. The wireless radio module circuitry of the dance mat is wirelessly operatively connected to the transmission controller circuitry of the base device. The transmission controller circuitry of the base device is connected via the dedicated communication interface to the master control device circuitry. The transmission controller circuitry of the base device also includes a computing unit including at least one processor, a memory comprising an event buffer and an operating memory, timer circuitry referred to herein as a timer, and sequential module circuitry all of which are operatively connected through at least one data bus.

The exemplary transmission controller circuitry of the base device is configured to count transmission errors in signals received from the dance mat on each available transmission channel via operation of the computing unit and the sequence module circuitry. Also, through operation of the timer circuitry, the transmission controller circuitry of the base device is configured to determine whether the time regime for receipt of the uniformly periodically generated signals is observed. If a predefined transmission error threshold is exceeded or the predefined time regime is breached, the transmission controller circuitry of the base device is operative to reconfigure the wireless channels for communication with the at least one connected wireless dance mat.

In exemplary arrangements the data indicative of the occurrence of pressure applied on an area associated with a particular pressure sensor is received by the base device circuitry without additional delay through the communication channel that is configured through the pairing of the circuitry of a wireless dance mat with the base device circuitry, which minimizes delays associated with accessing the channel and receipt of the signals and data by the base device.

In exemplary arrangements the master control device comprises a computer including processor circuitry.

In some exemplary arrangements the master control device comprises a gaming console.

In some exemplary arrangements the master control device comprises a mobile device such as a smart phone or a tablet computer.

In exemplary arrangements the at least one transceiver circuit of the base device is configured for wireless communication with a wireless manipulation console. This configuration may reduce the overall dimensions of the arrangement and provide ease of use.

In exemplary arrangements the at least one transceiver circuit of the base device circuitry is configured for wireless communication with control circuitry of at least one lighting device such as for example interactive lights, RBG, TFT, DMX LED displays, the operation of which is synchronized with a signal from the master control device circuitry which is transmitted by the transmission controller circuitry. This enables the user activity to be organized, prompted or played without having to use a visual display and/or enables information from the display associated with the master control device circuitry to be supplemented with additional light effects in the user's environment while maintaining the synchronization of the effects with the tempo of audible music and visually perceivable images presented within the preconfigured time regime.

In exemplary arrangements the lights, the RBG, TFT, DMX LED light displays are synchronized with the base device circuitry by communication at a frequency of at least 50 data frames per second.

In exemplary arrangements the base device circuitry includes at least one transceiver circuit configured to support at least four communication channels.

An exemplary method of communication of the at least one wireless dance mat with the base device includes the steps of:

Recognizing a pressure event on the wireless dance mat, wherein the event corresponds to a detected change in the pressure state of one of the at least two pressure sensors read via the interface provided by the input module of the mat sensors, and causing the launch of operation of the wireless transmission radio module circuitry of the transmission controller circuitry of the mat.

Detecting the signal of the base device by the wireless transmission radio module circuitry of the dance mat based on a preconfigured identifying number or other identifying data associated with the base device.

Reading through operation of the transmission controller circuitry, the consecutive pressure events caused by person contact in sensing areas on the wireless dance mat, wherein the consecutive events correspond to a sequence of changes in the states of the pressure sensors read by means of the interface provided by the input module of the mat sensors which are in operative connection with the transmission controller circuitry.

Sending at a repeating fixed periodic frequency, data on the events from the wireless dance mat through signals sent through operation of the wireless transmission radio module of the wireless dance mat, wherein each signal includes a packet of transmitted data. The transmitted data in each sequential signal includes sequential position data which indicates the position of the signal in the sequential order, and wherein the frequency of sending the data signals is maintained in accordance with the predefined time regime.

Receiving through operation of the wireless transmission radio module circuitry of the base device, the signals that include data corresponding to the events detected as occurring at the wireless dance mat.

Counting through operation of the sequential module circuitry of the transmission controller circuitry of the base device, the number of transmission errors on each available transmission channel, wherein the lack of transmission of signals for more than a threshold period of time is distinguished from a failed transmission by reading information about transmission statuses of the at least one transceiver circuit, and also by comparing the integrity of the transmitted signals and data from the particular dance mat, and also determining the number of lost signals to determine any signals that are not properly received by the base device.

Checking through operation of the timer of the transmission controller circuit of the base device, whether receipt of signals occurs in accordance with the predetermined time regime of event transmission. This allows continuity of system operation to be maintained under the set time regime.

Monitoring transmission errors on a channel, wherein if the number of transmission errors exceeds a predetermined threshold, or the predefined time regime is exceeded, the base device circuitry is operative to select another available operation channel within the time regime without stopping the transmission on the other channels, and broadcasts through operation of the wireless transmission radio module circuitry, information about the new channel configuration including at least one channel change signal to the at least one wireless dance mat connected at a given time, on the change of the channel configuration. This enables the communication channel configuration to be changed without losing the continuous set parameters for the time regime or causing a lapse in the periodic signal transmission or the signal sequence.

Updating the channel configuration of the at least one wireless dance mat in response to receiving the at least one channel change signal including the information about the change of the channel configuration from the base device circuitry, wherein the configuring includes storing data in a nonvolatile memory of the transmission controller of the wireless dance mat, wherein the exemplary data comprises at least a number identifying the base device, the number of the operating channel, and the allocated time resources. This allows the wireless dance mat configuration to be changed without losing the set parameters for the time regime.

Confirming the channel configuration through operation of the wireless transmission radio module circuitry of the at least one wireless dance mat and starting the transmission on the new channel and ceasing the transmission on the previous channel, wherein the start and end of the transmission occurs while continuing without lapse, the transmission of signals on the uniform periodic time basis and while maintaining the sequential order thus preserving the predefined time regime. This allows communication on an available uninterrupted communication channel while observing the time regime, and therefore in a manner that is unnoticeable to the user and without affecting the user's perception of signals and conditions.

In exemplary arrangements the base device circuitry operates to determine the integrity of the received signals and data by verifying whether the data corresponding to the position in the sequence for consecutively received signals are consecutive, and determining a number of lost signals based on determining a difference between the position data included in a last received signal and the position data included in a currently received signal.

Further in exemplary arrangements comparing the integrity of the transmitted data and signals includes verifying the data corresponding to the at least one verification value included in the signal. This includes in exemplary arrangements verifying the checksums of the cyclic redundancy code.

In exemplary arrangements, before the step of detecting the base device is performed by a wireless dance mat for the first time, and before transmission of signals starts, there is a step of pairing the wireless dance mat (or other wireless device) and the base device, the exemplary pairing process includes:

Sending a request command for connecting a new device on a default configured call channel by the wireless transmission radio module of the base device, which command contains at least information corresponding to a unique number associated with the base device, a number of the operating channel of the at least two available channels, and at least one number corresponding to a free time slot to which the new dance mat is paired.

Launching the wireless dance mat circuitry (or circuitry of the other wireless device) in a pairing mode in which the mat or other device switches into a listening mode on the call channel.

Transmitting information about the start of the pairing process from the base device on the call channel to the transceiver circuitry of the mat (or other device).

Returning a data reception acknowledgment through operation of the wireless transmission radio module circuitry of the wireless dance mat (or other wireless device) after receiving a frame of data on the start of the pairing process on the call channel from the base device.

Configuring the dance mat by including the number identifying the base device and the number of the operating channel, and of the allocated time slots by storing the data in nonvolatile memory of the transmission controller circuitry of the wireless dance mat (or the memory of the other device) and then ending the pairing process, and the transmission controller circuitry of the wireless dance mat (or other device) is operated to switch into communication on the configured channel and waits for the start of data transmission in operating mode.

Configuring a wireless dance mat or other device for communication with the base device before starting to use the system enables operation on a configured channel with a fixed number of wireless devices communicating with the base device. In exemplary arrangements there is no need to negotiate communication conditions each time when a device connects to the base device. Moreover, preconfiguration of the communication channel enables a wireless device, such as a wireless dance mat, to be ready for operation as soon as its circuity is awakened by beginning data transmission operation, which has a positive effect on reducing energy consumption.

In exemplary arrangements a wireless device may include a wireless manipulation console or at least one wireless controller of at least one lighting device, such as interactive lights, RGB, TFT, DMX LED displays.

In exemplary arrangements the sending and receiving of signals between wireless devices take place in a Time Division Multiple Access (TDMA) transmission mode.

In exemplary arrangements the sending and receiving of signals takes place by utilizing the technique of Time Division Duplex (TDD) between the sending and receiving.

In exemplary arrangements the wireless communication channel is divided into time slots to which the at least one wireless dance mat, wireless manipulation console, and/or the at least one wireless controller of the lighting device, such as interactive lights, RGB, TFT, DMX LED displays, is assigned.

In the exemplary arrangement the first time slot of the communication channel is utilized by the base device. The remaining time slots are utilized for the communication of the at least one wireless dance mat, or a wireless manipulation console in a direction toward the base device, or for the communication of controllers of lighting devices such as interactive lights, the RGB, TFT, DMX LED displays communicating in a direction from the base device.

In exemplary arrangements the base device is configured to manage the communication channel and the connected devices are operated as slaves of the base device.

In exemplary arrangements at least four communication channels are utilized for the communication of the base device with the at least one wireless dance mat.

In some arrangements 10 communication channels may be utilized for communication of the base device with the at least one wireless dance mat.

In exemplary arrangements at least one item of computer readable media bearing circuit executable instructions is operative to cause at least one circuit to implement the methods carried out by the base device circuitry and/or the wireless dance mat circuitry as described herein.

The exemplary arrangements provide for wireless communication that enables a strict time regime to be observed that does not introduce a delay that is noticeable to a user. Operation with the bandwidth of for example 2 MB/s allows the attainment of timing (frequency of event transmission) at the level of 2 ms. Exemplary arrangements provide for timing in a range of from 2 ms to 5 ms, which is much faster than many other systems.

Further in exemplary arrangements the method of communication is simplified and enables communication while utilizing a minimum amount of energy. This is because communication from the wireless dance mat occurs only when the pressure events are detected in the sensing areas associated with the mat sensors, or when the dance mat and base device undergo pairing. Moreover the solution of wireless transmission of synchronization data for controlling additional lighting and for the base device sending to each dance mat uniform periodic tempo signals which are operative to generate visual and/or audio signals from the circuitry of the dance mat, provides advantages compared to other systems. Exemplary arrangements also provide for wireless connection of an additional manipulation console.

Further features of exemplary arrangements will be made apparent in the following detailed description and the appended claims.

DETAILED DESCRIPTION

Figure 1:
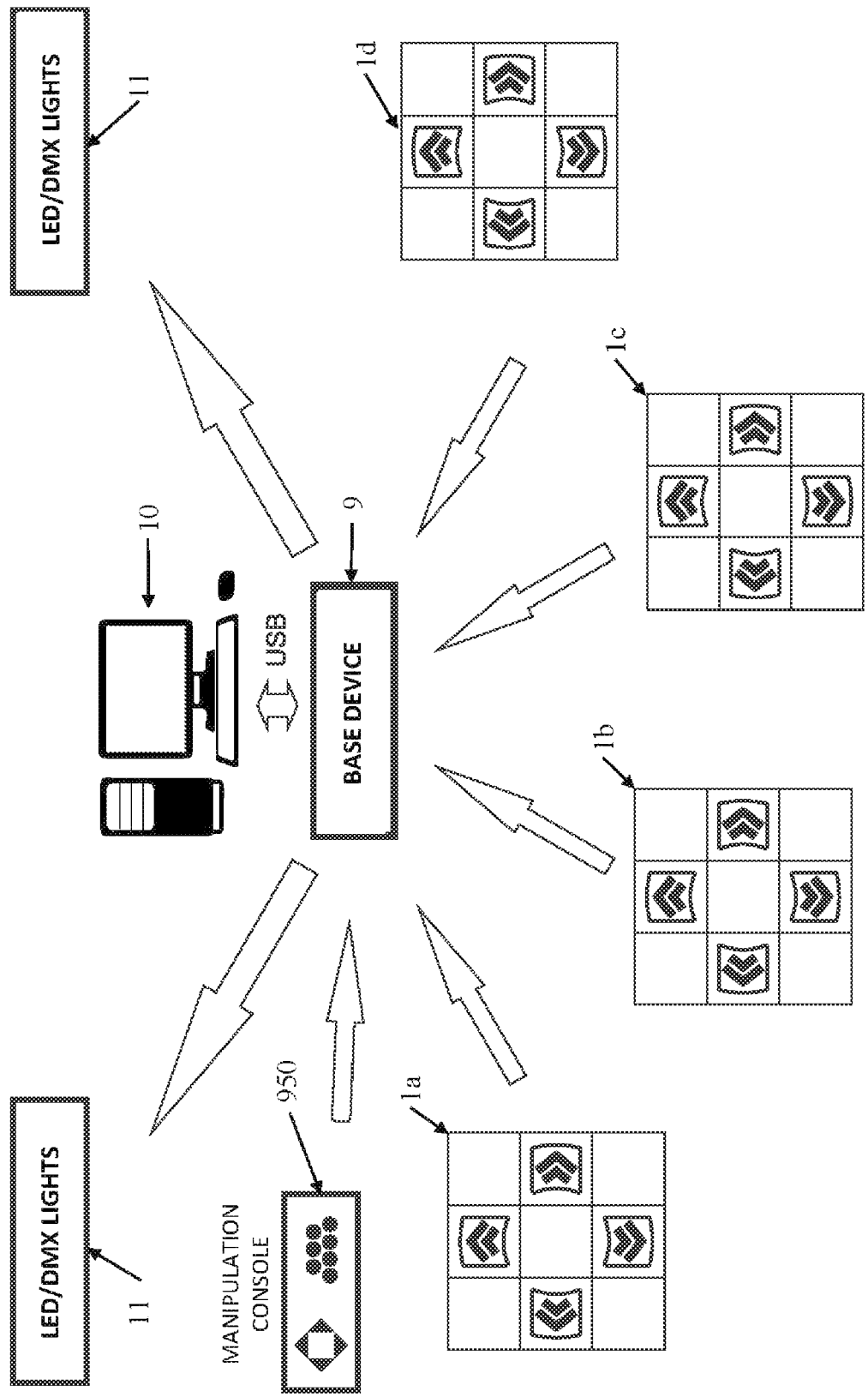
FIG. 1 is a schematic view of the system including a plurality of wireless dance mats, a base device, a master control device and a plurality of lighting controllers.
Figure 2:
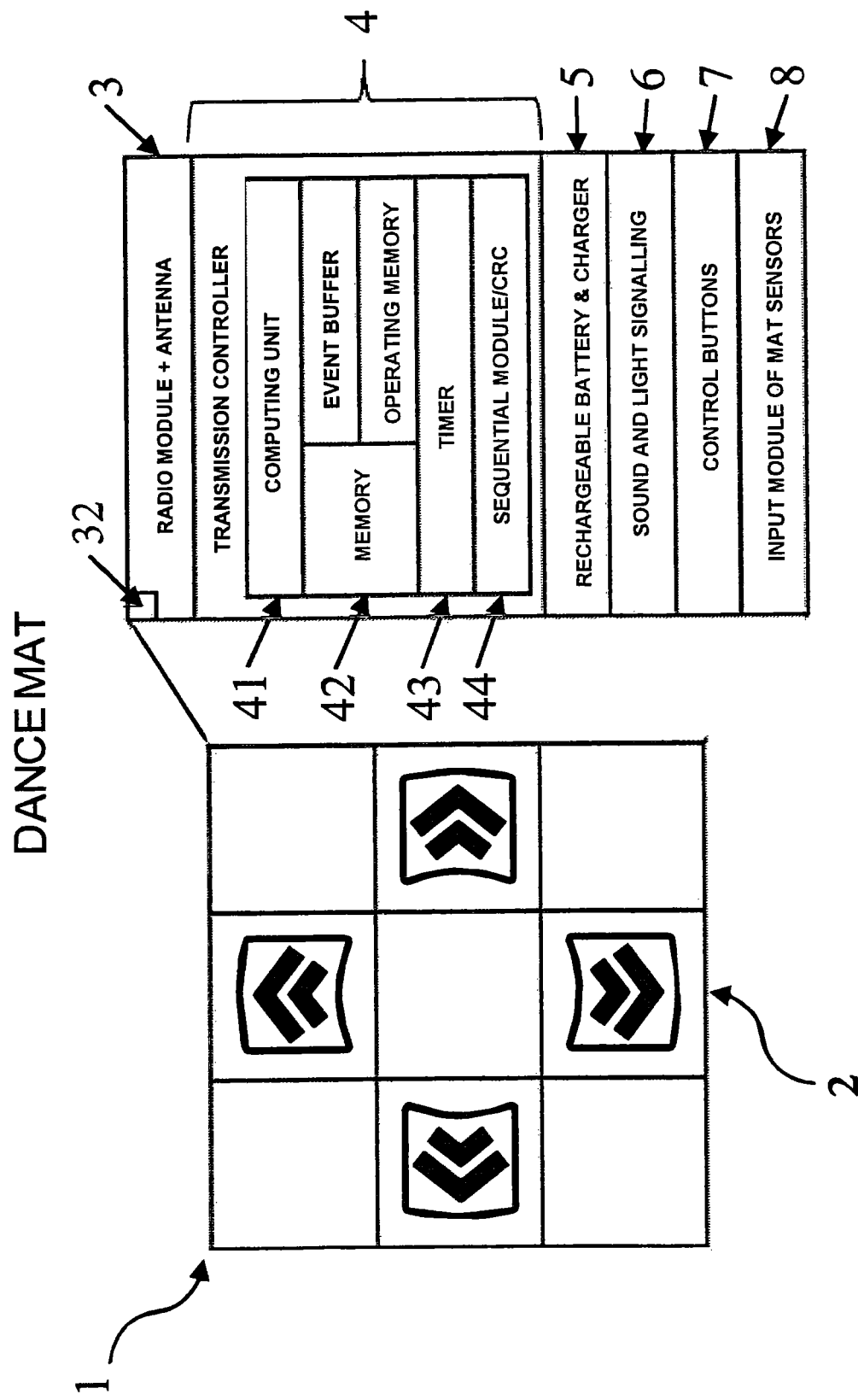
FIG. 2 is a block diagram that schematically represents circuitry and components of an exemplary wireless dance mat.
Figure 3:
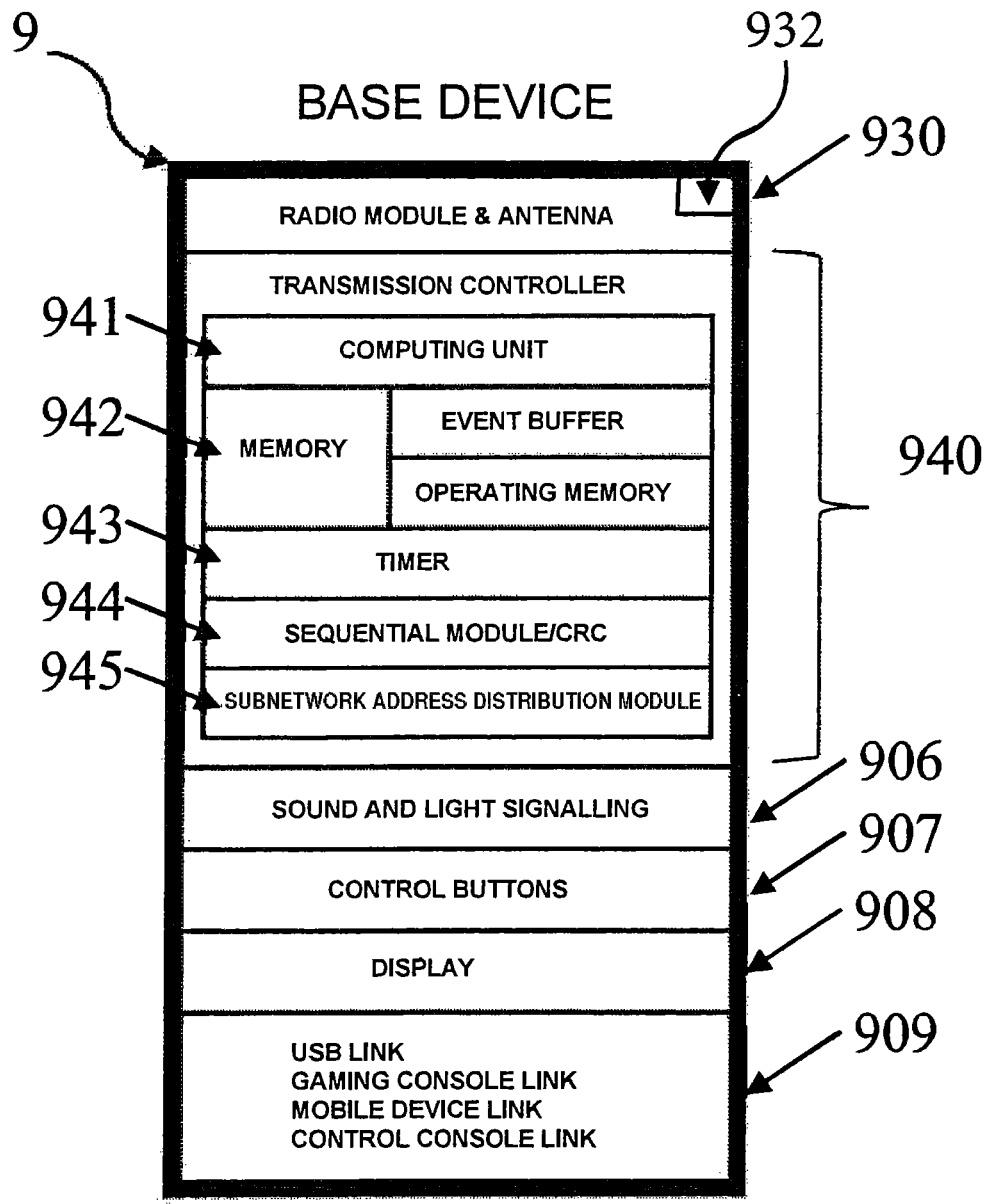
FIG. 3 is a block diagram that schematically represents circuitry and components of an exemplary base device.

Referring now to the drawings and particularly to FIG. 1 there is shown therein a wireless dance mat 1. The exemplary wireless dance mat includes a plurality of pressure sensors 2. The exemplary dance mat further includes wireless transmission radio module circuitry 3 and an antenna 31. Transmission controller circuitry 4, a rechargeable battery 5 and sound and light signaling circuitry 6 that includes at least one visual or audio output device, are also included in the exemplary wireless dance mat.

The exemplary wireless dance mat further includes at least one input device which in the exemplary arrangement comprises control buttons 7. The exemplary control buttons enable a user to perform activities such as to turn the dance mat on or off and also to provide inputs to initiate pairing of the dance mat with the base device.

An input module 8 which comprises an interface for signals provided by the pressure sensors is also provided. The exemplary input module 8 is operative to receive signals which correspond to the pressure state of each of the pressure sensors 2. In the exemplary arrangement the pressure state data is indicative of whether at least a threshold level of pressure that corresponds to foot contact is sensed in a sensing area associated with the pressure sensor. The wireless transmission radio module circuitry 3 and the transceiver circuitry 32 are configured for communication with the base device 9. The transmission controller circuitry 4 is in operative connection with the wireless transmission radio module circuitry. The transmission controller circuitry is operative to provide processing of data received from the at least two pressure sensors via the input module 8. In the exemplary arrangement processing of the data by the transmission controller circuitry includes including in the transmitted signals from the dance mat, data corresponding to the pressure sensed by each of the pressure sensors at the time of signal transmission as well as data that enables the integrity of the transmitted data to be verified through operation of the base device that receives the signals. In the exemplary arrangement the signals are transmitted on uniform periodic time basis. The predefined time regime corresponds with a set permissible delay value for the transmission of data regarding a sensed event and in exemplary arrangements is in the range of from 2 ms to 5 ms. Of course it should be understood that this periodic time basis for the transmission of sequential signals is exemplary and in other arrangements other time regimes may be used.

The transmission controller circuitry of the exemplary wireless dance mat 1 includes a computing unit 41, at least one data store which is alternatively referred to herein as a memory 42. The exemplary memory includes an event buffer and an operating memory. The exemplary transmission controller circuitry 4 includes timer circuitry which is alternatively referred to herein as a timer 43 and sequential module circuitry 44. At least one data bus operatively connects components which comprise the transmission controller circuitry.

The exemplary transmission controller circuitry utilized in the exemplary dance mat includes one or more circuits that are operative to communicate electrical signals and to control operational activities of the connected circuit components. In exemplary arrangements the circuitry includes at least one processor suitable for carrying out circuit executable instructions that are stored in one or more operatively connected data stores. Exemplary processors include or are in connection with nonvolatile storage media including instructions which include a basic input/output system (BIOS). For example the processors may correspond to one or more or combination of a CPU, FPGA, ASIC or other integrated circuit or other type of circuit that is capable of processing data and instructions. The data stores in operative connection with the processor may include one or more of volatile or nonvolatile memories such as random access memory, flash memory, magnetic memory, optical memory, solid-state memory or other media that are operative to store processor executable instructions. Processor executable instructions may include instructions in any of the plurality of programming languages and formats including, without limitation, routines, subroutines, programs, threads of execution, objects, methodologies and functions which cause processor circuitry to carry out the actions such as those described herein. Structures for processor circuitry may include, corresponds to and utilize the principles described in the textbook entitled Microprocessor Architecture, Programming and Applications with the 8085 by Ramesh S. Gaonker, Sixth Edition (Penram International Publishing 2013) which is incorporated herein by reference in its entirety.

The exemplary data stores used in connection with exemplary arrangements may include any one or more of several types of media suitable for holding processor circuit executable instructions. These may include for example, magnetic media, optical media, solid-state media or other types of media such as RAM, ROM, PROMs, flash memory, computer hard drives, or any other form of media suitable for holding circuit executable instructions and data. Numerous different arrangements of processor circuitry may be utilized in connection with the exemplary wireless dance mats, the base device and other devices that are described herein.

The exemplary transmission controller circuitry 4 of an exemplary dance mat arrangement is configured to mark the uniform periodically generated signals of the dance mat by including data in the signals which correspond to a position of the respective signal in a continuous sequential order of such generated signals. In exemplary arrangements the data that is included corresponds to a consecutive natural number which corresponds to the position in the sequential order of the particular signal. This data is generated for inclusion in the signals by the sequential module circuitry 44 of the dance mat.

The exemplary transmission controller circuitry 4 is further operative to include in the generated signals data corresponding to a verification value that is usable to verify that other data included in the respective signal has been accurately received by a receiving device. In exemplary arrangements the sequential module circuitry 44 is operative to specify checksums by including a cyclic redundancy code (CRC) value in the data associated with each signal. Of course it should be understood that this approach is exemplary and in other arrangements other types of verification value data may be utilized.

The base device 9 included in the exemplary system is operative to communicate with one or more wireless dance mats 1. In the exemplary arrangement the base device includes sound and light signaling circuitry 906 and at least one input device which in the exemplary arrangement comprises control buttons 907. The exemplary base device further includes a dedicated communication interface 909 which is in operative connection with a master control device 10 and the associated circuitry thereof. The exemplary base device further includes wireless transmission radio module circuitry 930 which includes 20 transceivers 932. In the exemplary arrangement each transceiver 932 is configured to communicate with a wireless dance mat. Further in exemplary arrangements each transceiver can communicate with 8 wireless dance mats. Thus in the exemplary arrangement the exemplary base device may communicate with up to 80 dance mats. Of course it should be understood that this arrangement is exemplary and in other arrangements other components and operational capabilities may be utilized.

In the exemplary arrangement the wireless radio transmission module circuitry 930 of the base device 9 is in operative connection with the transmission controller circuitry 940 of the base device. The exemplary transmission controller circuitry 940 is in operative connection via the dedicated communication interface 909 with the master control device 10 and its associated circuitry. Further, the transmission controller circuitry 940 includes a computing unit 941, at least one memory 942 that comprises an event buffer and in operating memory, timer circuitry 943, and sequential module circuitry 944, and subnetwork address distribution module circuitry 945, which are all in operative connection through at least one data bus. The exemplary transmission controller circuitry 940 is configured to determine transmission errors that occur on each available transmission channel through operation of the computing unit 941 and sequential module circuitry 944.

In the exemplary arrangement the transmission controller circuitry 940 of the base device 9 is operative responsive at least in part to the timer 943 to determine if the uniform periodic time signals are received in accordance with the specified time regime. The transmission controller circuitry is operative to determine if one or more signals that are expected in accordance with the uniform periodic basis upon which signals are transmitted, are not received. If one or more signals are not received such that a set transmission error threshold is exceeded or the predefined time regime is breached, the transmission controller circuitry is operative to reconfigure the communication channels for the at least one wireless dance mat operating on the channel in which the errors or the delays in receipt by the base device which breach the time regime have occurred. In exemplary arrangements the base device circuitry operates to communicate at least one channel change signal to the wireless dance mat which is currently communicating on communication channel in which the errors or delays have occurred. The transmission controller circuitry of the wireless dance mat operates responsive to the received at least one channel change signal to cause cessation of the transmitted signals on at least one channel on which the signals are currently being transmitted, and commencement of transmission of transmitted signals on at least one other channel that is currently available and that is different from the first channel, while continuing without lapse, the transmission of signals on the uniform periodic timed basis and in the sequential order. While this change of communication is carried out for the one wireless dance mat through operation of the base device circuitry and the dance mat circuitry, the configurations of the other dance mats remain unchanged.

In the exemplary arrangements the master control device 10 comprises a computer including at least one processor and a data store having structures like those previously described. In other exemplary arrangements the master control device 10 comprises a gaming console. In other exemplary arrangements the master control device 10 comprises a mobile device such as a smart phone or tablet computer. Of course these arrangements are exemplary and in other arrangements other approaches may be used.

The exemplary base device 9 includes at least one transceiver circuit 932 that is configured for wireless communication with a wireless manipulation console 950.

The base device 9 according to the exemplary arrangement includes at least one transceiver circuit that is configured for wireless communication with control circuitry 11 of lighting devices such as interactive lights, RBG, TFT, DMX LED displays, the operation which is synchronized with a signal from the master control device 10 which is provided from the base device through operation of the transmission controller circuitry 940. In exemplary arrangements the light control circuitry 11 utilize communication in a direction from the base device 9 toward the light control circuitry 11 and does not interfere with the communication of signals from the wireless dance mats 1 to the base device.

In exemplary arrangements the communication to the light control circuitry associated with the RBG, TFT, DMX LED displays are synchronized at a frequency of at least 50 frames per second.

In exemplary arrangements the base device 9 includes at least one transceiver circuit that is configured to support at least four communication channels.

In some exemplary arrangements the base device 9 is operative to communicate to each wireless dance mat, uniform periodic tempo signals which correspond to a music tempo of music that is audible to a person dancing in contact with the respective dance mat. In exemplary arrangements the uniform periodic tempo signals may be generated through operation of the circuitry of the master control device 10 which in exemplary arrangements may also be operative to control the output of the music. The sound and signaling circuitry of the exemplary wireless dance mat includes at least one output device that is configured to provide at least one of audible or visual outputs. The at least one output device is in operative connection with the transmission controller circuitry of the dance mat. Responsive to receipt of the uniform periodic tempo signals, the transmission controller circuitry is operative to cause the at least one output device to provide at least one output in timed correspondence with the received tempo signals. This aspect of the exemplary arrangement may be used to facilitate the user's music coordinated dance contact with the wireless dance mat. Of course this approach is exemplary and in other arrangements other approaches may be used.

A method of communication of the at least one wireless dance mat 1 with the base device 10, according to an exemplary arrangement, includes the steps of:

a) recognizing a pressure event on the wireless dance mat 1, wherein the event should be understood as a change in the state of one of the at least two pressure sensors 2 read via the interface provided by the input module 8 of the mat sensors, and launching the operation of wireless transmission radio module circuitry 3 by the transmission controller circuitry 4 of the mat in response thereto, b) detecting a signal of the base device 9 by the wireless transmission radio module circuitry 3, based on receipt of base device identifying data which in the exemplary arrangement comprises a preconfigured number identifying the base device 9, c) reading the consecutive pressure events on the wireless dance mat 1, wherein the consecutive events should be understood as a sequence of changes in the states of the pressure sensors 2 read by means of the input module 8 in operative connection with the mat sensors of the transmission controller 4, d) sending, with a uniform fixed frequency, signals including pressure data corresponding to the events from the wireless dance mat 1, to the base device 9 via operation of the wireless transmission radio module circuitry 3 of the wireless dance mat 1, wherein each signal includes a data packet in the transmitted data that is marked with or otherwise includes a consecutive ordinal number which corresponds to a position in the sequential numerical order of signals by the transmission controller circuitry 4, and the frequency of the sending results from the predefined time regime, e) receiving, by the wireless transmission radio module circuitry 930 of the base device 9, the signals including the data on the pressure events detected in the at least one wireless mat 1, f) determining by counting, by the sequential module circuitry 944 of the transmission controller 940 of the base device 9, the number of transmission errors on each available transmission channel, wherein the lack of transmission of signals by a dance mat is distinguished from a failed receipt of signal transmission by reading information about transmission statuses of the at least one transceiver of the base device (the lack of transmission is not treated as an error that is counted), and also by comparing the integrity of the transmitted data from a particular device, by determining the number of lost signals, g) checking, by means of the timer 943 of the transmission controller 940 of the base device, whether the predetermined time regime of event transmission is observed, h) monitoring transmission errors of a channel by the base device circuitry, wherein if the number of transmission errors exceeds the predefined threshold or if the predefined time regime for receipt of signals is exceeded, the base device 9 selects another available operation channel within the time regime without stopping the transmission on the other channels and broadcasts, through programmed operation of the wireless transmission radio module circuitry 3. This is done by sending at least one channel change signal that includes information about the new channel configuration to each of the at least one wireless dance mat 1 connected at a given time on the change of the channel configuration, i) updating the channel configuration of the at least one wireless dance mat 1 through operation of the dance mat circuitry in response to receiving the information in the at least one channel change signal received from the base device about the change of the channel configuration, wherein the configuring includes storing data in a non-volatile memory of the transmission controller circuitry 4 of the wireless dance mat 1, and the stored data comprises at least the number identifying the base device 9, the number of the operating channel and the allocated time resources, j) confirming the channel configuration by the wireless transmission radio module circuitry 3 of the at least one wireless dance mat 1 by starting the transmission on the new channel and ending the transmission on the previous channel, wherein the start and end of the transmission occur while observing the predefined time regime by continuing transmission of signals on the uniform timed basis and continuing to include the position data in signals indicating the position of the respective signal in the sequential order, without lapse.

The method according to an aspect of the exemplary arrangement is also characterized in that determining the integrity of the transmitted data includes verifying whether the consecutive packets are marked with or otherwise include data corresponding to a consecutive ordinal position number, and determining the number of lost signals. In exemplary arrangements this includes determining the difference between the number of the last received packet and the number of the currently received packet.

According to another aspect of exemplary arrangements, the method is characterized in that determining the integrity of the transmitted data includes verifying that the signals are accurately received through analysis of the verification data included in the signals. In an exemplary arrangement this includes analysis of the checksums of the cyclic redundancy code.

The method according to a further aspect of an exemplary arrangement is characterized in that, before the step b) of detecting the base device 9 is performed for the first time and before the transmission starts under the steps d) and e), there is a step of pairing the wireless dance mat 1 (or a wireless device 111) to the base device 9, which includes:

k) sending a request command for connecting a new device on a default configured call channel by the wireless transmission radio module circuitry 930 of the base device 9, which command contains at least information about the unique number of the base device 9 which serves as base device identifying data, the number of the operating channel of the at least two channels, and at least one free number of a time slot to which the new wireless dance mat 1 is to be paired, l) launching the operation of the circuitry of the wireless dance mat 1 (or the wireless device 111) in a pairing mode in which the transmission controller circuitry of the mat switches into a listening mode on the call channel, m) transmitting information about the start of the pairing process from the base device 9 on the call channel which is received by the transceiver circuit 32 of the mat, n) returning a data reception acknowledgment by the wireless transmission radio module circuitry 3 of the wireless dance mat 1 (or by the wireless device 111) after receiving a signal including a frame of data on the start of the pairing process from the base device 9 on the call channel, o) configuring the base device identifying data which corresponds to the number identifying the base device 9, the number of the designated operating channel and of the allocated time slots, by storing the data in the non-volatile memory of the transmission controller circuitry 4 of the wireless dance mat 1 (or in a memory of the wireless device 111), and then p) ending the pairing process by the transmission controller circuitry 4 of the wireless dance mat 1 (or the wireless device 111) switching into communication on the configured channel and waiting for the start of data transmission in an operation mode.

In some exemplary arrangements the wireless device 111 may include the wireless manipulation console 950 or the at least one wireless controller 11 of the interactive lights, the RGB, TFT, DMX LED displays.

The method according to an aspect of an exemplary arrangement is characterized in that the sending and receiving of signals take place in the Time Division Multiple Access (TDMA) transmission mode.

The method according to an aspect of an exemplary arrangement provides that the sending and receiving of signals take place by utilizing a technique of Time Division Duplex (TDD) between the sending and receiving.

The method according to an aspect of an exemplary arrangement is characterized in that the communication channel is divided into 9 time slots to which the individual devices are assigned, wherein these devices include the at least one wireless dance mat 1, or wireless manipulation console 950, or the at least one wirelessly connected controller 11 of the interactive lights, the RGB, TFT, DMX LED displays. In exemplary arrangements steps similar to those carried out with the wireless dance mats 1 are utilized for pairing the light controllers 11. The steps from k) to p), instead of being applied to the wireless dance mat, may be applied to the wireless controller 11 (replacing the component names in the previously described steps is sufficient to obtain an accurate description).

In a method according to an aspect of an exemplary arrangement the first time slot of the communication channel is reserved for the base device 9 and enables, in principle, communication from the base device 9 toward the paired devices. The remaining 8 time slots are used for the communication of the 2 wireless mats 1$a$-1$b$ in a direction toward the base device 9—with four time slots per each mat. In another exemplary arrangement, all the time slots are assigned to one wireless dance mat 1 to provide an even stricter time regime for receipt of signals indicative of user reaction provided by the data indicative of the detected pressure events. In yet another aspect of an exemplary arrangement, four time slots in one channel are used for the communication of one wireless mat 1, and one of the remaining time slots is used for the bidirectional communication of the manipulation console 950 with the base device 9. The last three time slots are used for communication with the wireless controller 11 of the light displays including interactive lights, the RGB, TFT, DMX LED displays, which communication is in a direction from the base device toward this controller.

In the method according to an exemplary arrangement the base device 9 is configured to manage the communication channels and the connected devices are slaves of the base device.

In the method according to an aspect of an exemplary arrangement at least 4 communication channels are utilized for the communication of the base device 9 with the at least one wireless dance mat 1.

In the method according to an aspect of an exemplary arrangement 10 communication channels are utilized for the communication of the base device 9 with the at least one wireless dance mat 1.

Circuit executable instructions that reside on at least one media item that comprises a computer program product, implements the methods according to the exemplary arrangements. It is understood that the product may consist of independent media items that are resident and launched on separate devices. The devices in the exemplary arrangement include the base device 9 and the wireless dance mats. The computer program product provides instructions that are operative to control peripherals that are components of an exemplary system that include the dance mat transmission controller circuitry 4 and the transmission controller circuitry 940 of the base device 9. The components that serve as the transmission controller circuitry 4 comprise at least a computing unit 41, a memory 42 comprising an event buffer and an operating memory, a timer 43, and a sequential module circuit 44 that are connected through at least one data bus. The components that serve as the transmission controller circuitry 940 of the base device 9 comprise at least a computing unit 941, a memory 942 comprising an event buffer and an operating memory, a timer 943, and a sequential module circuit 944 that are connected through at least one data bus.

According to another exemplary arrangement, the system comprises a device 9 including wireless transmission radio module circuitry 930 including from 1 to 10 transceivers 932. By way of example, circuit arrangements available under the designation RFM75PW can be utilized (to support from 1 to 80 wireless mats), and wireless dance mats 1$a$, 1$b$, . . . , 1$h$ including an energy-efficient microprocessor-based transmission controller 4 coupled through wireless transmission radio module circuity 3 to one transceiver circuit 32, by way of example, arrangements available under the designation RFM75PW can be utilized. The exemplary wireless dance mat 1 has its own power source in the form of a rechargeable battery 5 or a disposable battery, and a rechargeable battery charger. User input devices in the form of control buttons 7 installed in the wireless dance mat 1 are connected to the transmission controller circuitry 4 in the mat.

The exemplary base device 9 also pairs wirelessly to a wireless controller 11 of a light organ/strobe light/light device with a DMX link and can send control signals for these devices (such as commands for synchronizing the flash with the tempo of the music, attention-attracting lighting sequences, etc.) wirelessly to these devices using the same time regime. In particular, a time slot of the base device 9, i.e., the first time slot that is for communication in a direction from the base device 9 toward the other devices, is utilized. As previously discussed such signals may also be used in some arrangements for sending tempo signals which may correspond to music that is audibly presented to a user. Such signals may also be received by dance mats and utilized to provide outputs from at least one output device associated with the sound and light signaling circuitry of the mat.

A manipulation console 950 that facilitates selecting songs to be presented to a user, setting parameters corresponding to difficulty levels, and managing aspects of the mat system such as which dance mats are operable in the system, can also be connected wirelessly to the base device 9.

The transmission approach utilized in exemplary arrangements is based on a point-to-multipoint communication structure with a constant TDMA time regime, as opposed to the more often used CSMA approach, in which the transmitters have to wait for their turn to transmit and a constant time regime of data frame transmission is not observed. Operation with a bandwidth of, for example, 2 Mb/s obtaining timing (frequency of event transmission) at a level of 2 ms. The exemplary method of communication utilizes, by way of example, operation on the 2.4 GHz frequency band, i.e., in the band that is available to the public for the purpose of short-range mobile communication in accordance with the applicable standards.

Communication with the master control device 10, by way of example, a PC/MAC-class computer in exemplary arrangements, is implemented by virtue of the USB2.0/USB3.0 standard. In another exemplary arrangement, the master control device 10 may comprise a gaming console and a communication link type dedicated to the given console (PS2, PS3, PS4, PS5, XBOX, XBOX360, XBOX One, Nintendo Wii, Nintendo Switch). In an example in which the master control device 10 comprises a mobile device, i.e., a smartphone or tablet (iOS, iPad OS and Android), communication may comprise a Bluetooth link.

The exemplary base device 9, when analyzing transmission errors on a given operating channel that is in use, checks the occupancy/load of that channel and, if necessary, transfers the transmission to another, less noised/interfered channel, informing all the wireless dance mats 1 that communicate with the base device at a given time about this fact. The transfer to another channel in exemplary arrangements is fully automatic, it is performed without the user's involvement, occurring within the fixed time regime without causing any significant delays in reading the pressure sensors 2 in the wireless dance mats 1*a*-*h*.

The exemplary system includes circuitry that is able to detect a second identical system operating in the immediate environment and set the transmission channels in such a manner that both systems do not interfere with each other.

The exemplary method of communication used in some exemplary systems may be similar to the Bluetooth protocol (frame structure, piconet addressing) and telecommunications networks, e.g., GSM (TDMA transmission medium access technique—refers to the second-generation network).

Figure 4:
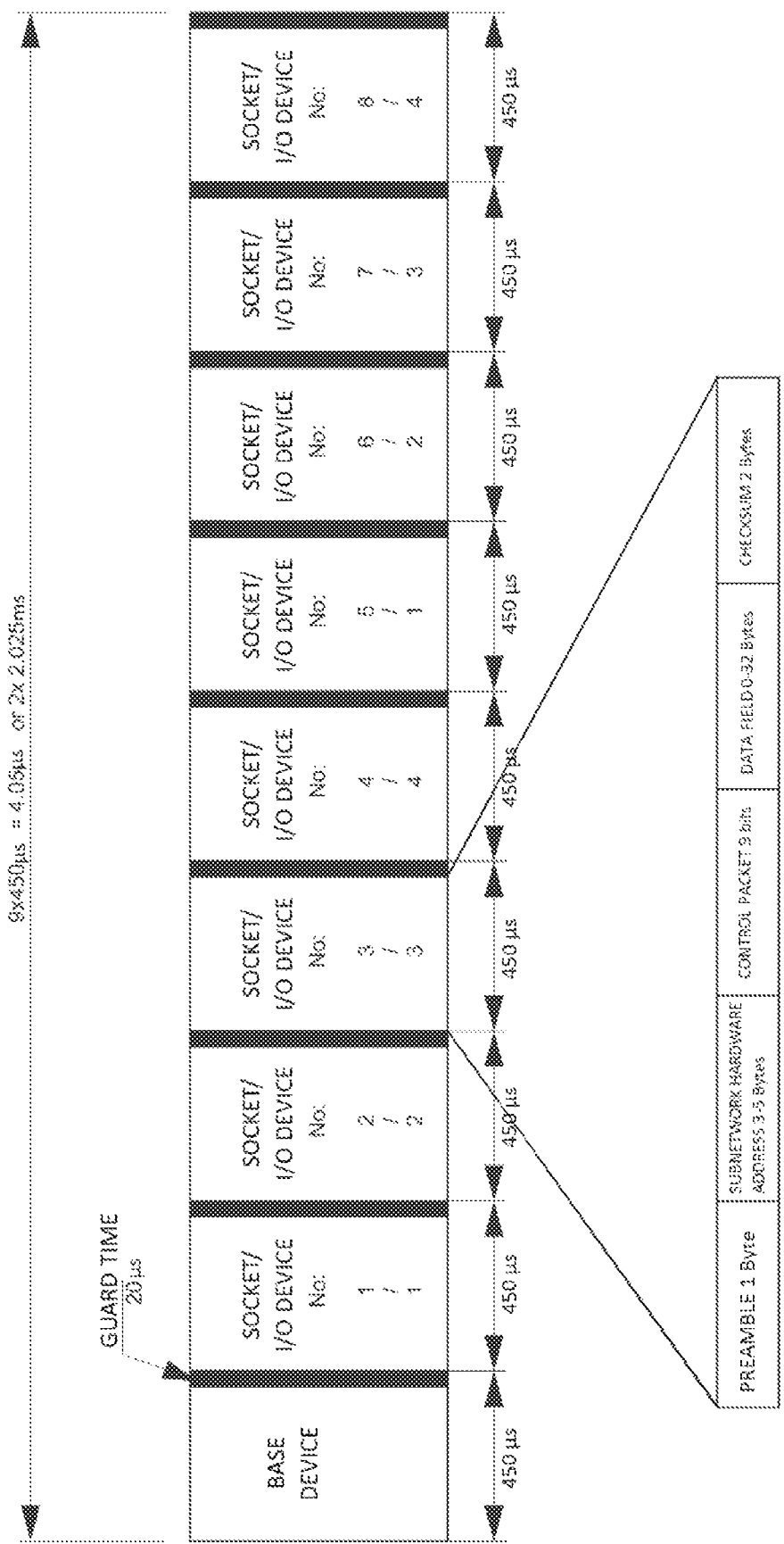
FIG. 4 is a schematic diagram representing frame data utilized for communication between devices in exemplary arrangements.

A useful aspect of the exemplary method of communication is the precisely defined transmission time for each of the devices (the wireless dance mats 1*a*-1*h* or wireless light controllers 11 or manipulation consoles 950) connected to the base device 9. This provides a channel operation mode in the TDMA (Time Division Multiple Access) technique. In exemplary arrangements, a single communication channel is divided into 9 time slots, as illustrated in FIG. 4, to which the individual devices (the wireless dance mats 1*a*-1*h* or wireless light controllers 11 or manipulation consoles 950) are assigned. The first slot (time slot) is reserved for the base device 9. The remaining 8 slots (time slots) are used for communication with the paired devices (the wireless dance mats 1*a*-1*h* or wireless light controllers 11 or manipulation consoles 950). The channel is managed by the circuitry of the base device 9 and the paired devices are slaves thereof. This technique is useful in that there is no problem of unlogged devices interfering with an ongoing data transmission from logged devices. Any unregistered devices that may possibly be present on the channel are not permitted to transmit.

The exemplary pairing method is a separate process that is carried out during the system launch. It is called at the user's request by providing at least one input to an input device before the system is launched.

The protocol used in the exemplary arrangement is resistant to the launch of another system in the vicinity by automatically allocating a new channel for the latter or signaling the inability to launch the system due to the occupancy of all supported channels.

By way of example, the use of a transmission speed of 2 Mb/s and a time slot for each of the devices having a width of ca. 450 μs provide a time for transmitting the states of the pressure sensors that is up to 2 ms for a 4 mats/channel system (4.5 slots of 450 μs=2025 μs) and up to 4 ms for an 8 mats/channel system (9 slots of 450 μs=4050 μs). In exemplary systems for 4 mats/channel configurations, the transmission controller 940 automatically allocates two time slots for each wireless dance mat 1, which results in twice as fast transmission per channel.

Also, in some arrangements for maximum utilization of the channel bandwidth, the transmission is organized by utilizing the TDD (Time Division Duplex) technique. That is, the transmission in individual time slots can take place only in one direction—toward the base device or toward the mat controllers.

FIG. 4 represents an example of a signal frame utilized in system operation for four mats. The first, longer slot is for the transmission of signals by the base device 9. The subsequent time slots are reserved consecutively for four wireless dance mats, wherein two slots (time slots) are assigned to each of the latter.

The TDMA frame is divided, by way of example, into 9 slots, where:
slot 1 is intended only for the base device 9 Beacon/Uplink transmission;
slots 2-9 are utilized by the paired devices, transmission direction: down-link.

In the example, the entire TDMA frame lasts for about 4 ms (9 slots of 450 μs=4050 μs).

In the exemplary transmission controller circuitry 940 of the base device 9 that supports four wireless mats 1, each of the paired devices is assigned two slots with an offset of 4—this guarantees an average transmission medium access time at a level of 2025 μs (4.5 slots of 450 μs=2025 μs).

The primary difference of the exemplary arrangement with respect to WiFi is that the system does not require the process of logging into the transmitter to be performed after turning on the power of any of the controllers (mats). The mats are ready for operation immediately after receiving the marker (beacon) configured during the pairing from the base device 9 (TDMA frame start marker).

This marker data, which in the exemplary arrangement occupies the first time slot, contains a unique number identifying the base device, and it is based thereon that the mats that have been assigned (in a separate pairing process) know that they can occupy the slot (time slot) that has been designated therefor. In the exemplary arrangement this enables the mats to be ready for transmission within a time of up to 4 msec after activation. Activating the mat comprises performing any action thereon, by way of example, applying force in a sensing area associated with a pressure sensor 2.

Such a mode of operation enables the energy consumption from the rechargeable battery to be considerably reduced because, once user idleness is determined by the mat not sending a change in pressure of more than a threshold time, e.g., 30 s, the circuitry operates to turn off the given wireless dance mat 1 (the wireless transmission radio module circuitry 3 and the transmission controller circuity 4 are turned off). Thereafter once a change in the state of the pressure sensors 2 is detected, it causes the launching of the operation of the transmission controller circuitry 4 and the wireless transmission radio module circuity 3. The signals from the wireless dance mat 1 are almost immediately detected by the base device, with an acceptable/unnoticeable delay for the first transmission.

The exemplary transmission controller circuity 940 of the base device 9, on a call channel (a dedicated channel not intended for normal operation), multicasts a frame with a request to connect a new device, which frame contains information, such as: a unique number of the base device 9, a dedicated number of the operation channel, and the number of the time slot to which the device is paired. Turning on the wireless dance mat 1 in a pairing mode (a mode called through pressing a combination of buttons when turning on the mat) causes the circuitry of the dance mat to switch into listening on the call channel. After receiving a frame of data on the start of the pairing process from the base device 9, a data reception acknowledgment is returned. The data which corresponds to base device identifying data is stored in the non-volatile memory in the transmission controller circuitry 4 of the wireless dance mat 1, whereupon the pairing process ends. After this operation, the paired device switches to the dedicated channel and waits for the start of data transmission signals in an operation mode. The process of pairing the wireless light controller 11 or the manipulation console 950 occurs in a similar manner.

In the case that, after activating the paired wireless device 111 or the wireless dance mats 1*a*-1*h*, the device does not receive the frame marker signals from the base device 9, the channels are scanned and the base device to which the wireless device 111 or the wireless dance mats 1*a*-1*h* are assigned is searched for (based on the unique number identifying the base device 9). If the base device 9 is detected, the wireless device 111 or the dance mats 1*a*-1*h* remain on this channel until the base device 9 permits the channel to be changed or until the expiry of the time limit from the time the transmission from the base device 9 ceases—then the wireless device 111 or the dance mats 1*a*-1*h* can start the process of searching through the channels again. If the repeated search does not enable a connection to be established, the devices must be paired again.

Since it is possible to put an unused wireless dance mat 1 to sleep for a longer period of time, the lack of transmission cannot be counted through operation of the base device circuitry as a transmission error. For this reason, the lack of transmission is distinguished from a failed transmission through circuit operation by reading information about transmission statuses of the at least one transceiver 932 of the base device 9. Thanks to the information about receiving a damaged packet from the transceiver (CRC errors), it is possible to determine the occurrence of transmission errors, which are counted. Receiving no data whatsoever may be determined through circuit operation to only be an indication of the fact that the wireless dance mat has turned off due to having gone to sleep as a result of user inactivity, and not as problems in the transmission of signals.

Another exemplary way of determining an error in the transmission of packets in the exemplary arrangements is to mark them consecutively, which is accomplished by including data corresponding to a position of the signal in the sequential order. Then the gaps in the position data for signals in the order can be employed to determine the number of transmission errors. By way of example, the sequential module circuitry 44 that has been implemented in the exemplary transmission controller circuitry will enable the addition of data to signals which correspond to further markings which further facilitates detection of the data lost in the transmission. A complete loss of communication with the wireless dance mat 1 is treated through operation of the circuitry as meaning that the mat is turned off and, in this case, does not trigger the process of the base device 9 changing the channel.

Thus the exemplary arrangements that have been described herein achieve improved operation, eliminate difficulties encountered in the use of prior systems and methods, and attain the useful results described herein.

In the foregoing description certain terms have been used for brevity, clarity and understanding. However, no unnecessary limitations are to be implied therefrom because such terms are used for descriptive purposes and are intended to be broadly construed. Moreover the descriptions and illustrations are by way of examples and the new and useful features are not limited to the exact features that have been shown or described.

It should be understood that the features and/or relationships associated with one exemplary arrangement can be combined with features and/or relationships from another exemplary arrangement. That is, various features and/or relationships from various arrangements can be combined to produce further arrangements. The new and useful scope of the disclosure is not limited to only the arrangements that have been specifically described herein.

Having described features, discoveries and principles of the exemplary arrangements, the manner in which they are constructed and operated, and the advantages and useful results attained, the new and useful features, devices, elements, arrangements, parts, combinations, systems, equipment, operations, methods, processes and relationships are set forth in the appended claims.

We claim:
1. Apparatus comprising:
a wireless dance mat configured to have a person dance in contacting engagement therewith, wherein the dance mat includes
  at least two pressure sensors,
    wherein each pressure sensor is configured to sense pressure applied to a respective corresponding sensing area of the dance mat associated with the pressure sensor, by person contact with the respective sensing area,
  a wireless transceiver,
  transmission controller circuitry,
    wherein the transmission controller circuitry is in operative connection with the at least two pressure sensors and the wireless transceiver,
  wherein the transmission controller circuitry is operative to cause
  the transceiver to transmit signals, wherein the transmitted signals
    are transmitted on a uniform periodic time basis and in a sequential order,
    wherein each transmitted signal includes data indicative of
      pressure sensed by each of the pressure sensors at a time of signal transmission, and
      a position of the respective signal in the sequential order.

2. The apparatus according to claim 1
wherein the sequential order comprises a sequential numerical order,
wherein the data corresponding to the position corresponds to a numerical value associated with the respective transmitted signal in the sequential numerical order.

3. The apparatus according to claim 1
wherein each transmitted data signal further includes data corresponding to
  a verification value, wherein the verification value is usable to determine that at least some data included in the signal has been accurately received by a receiving device.

4. The apparatus according to claim 1
wherein each transmitted data signal further includes data corresponding to
  a verification value, wherein the verification value is usable to determine that at least some data included in the signal has been accurately received by a receiving device,
  wherein the verification value includes a cyclic redundancy code value.

5. The apparatus according to claim 1
wherein the dance mat further includes
  at least one output device,
    wherein the at least one output device is configured to provide at least one of audible and visual outputs,
    wherein the at least one output device is in operative connection with the transmission controller circuitry,
    wherein the wireless transceiver is configured to receive uniform periodic tempo signals, whereby the tempo signals correspond to a music tempo of music that is audible to the person dancing in contact with the dance mat, wherein the transmission controller circuitry is operative to cause the at least one output device to provide at least one output in timed correspondence with the received tempo signals.
6. The apparatus according to claim 1
wherein the dance mat further includes a visual output device,
wherein the visual output device is in operative connection with the transmission controller circuitry,
wherein the transmission controller circuitry is operative to cause the visual output device to provide a visual output indicative that the dance mat is in wireless communication with a remote base device.
7. The apparatus according to claim 1
wherein the dance mat further includes
a battery,
a visual output device,
wherein the battery and the visual output device are in operative connection with the transmission controller circuitry,
wherein the transmission controller circuitry is further operative to cause at least one visual output from the visual output device indicative of a condition of the battery.
8. The apparatus according to claim 1
wherein the transmitted signals are periodically transmitted uniformly in a time range of from 2 to 5 ms,
wherein the data corresponding to the position is usable by a base device that receives the transmitted signals, to determine that at least one transmitted signal sent by the dance mat was not received by the base device.
9. The apparatus according to claim 1
wherein the transmission controller circuitry is further operative to cause the transmitted signals to include dance mat identifying data, wherein the dance mat identifying data is usable to identify the dance mat sending the transmitted signals.
10. The apparatus according to claim 1
wherein the transmission controller circuitry is further operative to cause the transmitted signals to include base device identifying data, wherein the base device identifying data is usable to identify a base device to which the transmitted signals are directed.
11. The apparatus according to claim 1
wherein the transmission controller circuitry is operative to cause the transmitted signals to be transmitted on at least one first channel,
wherein the wireless transceiver is configured to receive at least one channel change signal, wherein the transmission controller circuitry is operative responsive at least in part to the at least one channel change signal, to cause the transmitted signals to be transmitted on at least one second channel, that is different from the at least one first channel.
12. The apparatus according to claim 1
wherein the transmission controller circuitry is operative to cause the transmitted signals to be transmitted on at least one first channel,
wherein the wireless transceiver is configured to receive at least one channel change signal, wherein the transmission controller circuitry is operative responsive at least in part to the at least one channel change signal, to cause
cessation of transmission of the transmitted signals on the at least one first channel, and
commencement of transmission of the transmitted signals on at least one second channel, that is different from the at least one first channel, while continuing without lapse, the transmission of signals on a uniform periodic time basis and the sequential order.
13. The apparatus according to claim 1
wherein the transmission controller circuitry is operative to determine that the at least two pressure sensors have not detected a pressure change for at least a threshold time,
wherein responsive at least in part to the determination the transmission controller circuitry is operative cause cessation of transmission of the transmitted signals.
14. The apparatus according to claim 1 and further comprising:
a base device, wherein the base device includes base device circuitry,
wherein the base device circuitry is operative to receive the transmitted signals, and to determine when any of the signals from the dance mat are not received.
15. The apparatus according to claim 1 and further comprising:
a base device, wherein the base device includes base device circuitry,
wherein the base device circuitry is operative to receive the transmitted signals,
wherein the base device circuitry is operative responsive at least in part to the position data included in the transmitted signals to determine when any of the signals from the dance mat are not received.
16. The apparatus according to claim 1
wherein each transmitted signal further includes data corresponding to
a verification value, wherein the verification value is usable to determine that at least some data included in the signal has been accurately received,
and further comprising:
a base device, wherein the base device includes base device circuitry,
wherein the base device circuitry is operative to receive the transmitted signals,
wherein the base device circuitry is operative responsive at least in part to the verification value in each transmitted signal to determine when at least some data included in the respective signal from the dance mat is not accurately received.
17. The apparatus according to claim 1
and further comprising:
a base device, wherein the base device includes base device circuitry,
wherein the base device circuitry is operative to
receive the transmitted signals from the dance mat, and
send to the dance mat uniform periodic tempo signals, whereby the periodic tempo signals correspond to a music tempo of music that is audible to the person in contact with the dance mat,
wherein the dance mat further includes
at least one output device,
wherein the at least one output device is configured to provide at least one of audible and visual outputs,
wherein the at least one output device is in operative connection with the transmission controller circuitry,
wherein the wireless transceiver is configured to receive the uniform periodic tempo signals,
wherein transmission controller circuitry is operative to cause the at least one output device to provide at least one output in timed correspondence with the received tempo signals.

18. The apparatus according to claim 1 and further comprising:
a remote base device, wherein the remote base device includes base device circuitry,
wherein the base device circuitry is operative to send wireless signals to the dance mat,
wherein the dance mat further includes a visual output device,
wherein the visual output device is in operative connection with the transmission controller circuitry,
wherein the transmission controller circuitry is operative to cause the visual output device to provide a visual output indicative that the dance mat is in wireless communication with the remote base device.

19. The apparatus according to claim 1 and further comprising:
a base device, wherein the base device includes base device circuitry,
wherein the base device circuitry is operative to
receive the transmitted signals from the dance mat,
send to the dance mat uniform periodic tempo signals, whereby the periodic tempo signals correspond to a music tempo of music that is audible to the person dancing in contact with the dance mat,
send to at least one lighting device disposed from the dance mat, wireless light activation signals, wherein the light activation signals have a corresponding relationship with the tempo signals,
wherein the dance mat further includes
at least one output device,
wherein the at least one output device is configured to provide at least one of audible and visual outputs,
wherein the at least one output device is in operative connection with the transmission controller circuitry,
wherein the wireless transceiver is configured to receive the uniform periodic periodic tempo signals,
wherein transmission controller circuitry is operative to cause the at least one output device to provide at least one output in timed correspondence with the received tempo signals.

20. The apparatus according to claim 1 and further comprising:
a base device, wherein the base device includes base device circuitry,
wherein the base device circuitry is operative to receive the transmitted signals from the dance mat,
wherein the transmission controller circuitry of the dance mat is further operative to cause the transmitted signals to include dance mat identifying data,
wherein the base device circuitry is operative to determine data corresponding to the dance mat from which the signals are received responsive at least in part to the dance mat identifying data.

21. The apparatus according to claim 1 and further comprising:
a base device, wherein the base device includes base device circuitry,
wherein the base device circuitry is operative to
wirelessly transmit to the dance mat, base device identifying signals, and
receive from the dance mat the transmitted signals,
wherein the transmission controller circuitry of the dance mat is further operative responsive at least in part to the received base device identifying signals, to cause the transmitted signals to include base device identifying data,
wherein the base device circuitry is operative responsive at least in part to the received base device identifying signals to analyze pressure data included in the transmitted signals.

22. The apparatus according to claim 1 and further comprising:
a base device, wherein the base device includes base device circuitry,
wherein the base device circuitry is operative to receive the transmitted signals, and to determine when at least one of the signals from the dance mat is not received,
wherein the base device circuitry is operative responsive at least in part to the determination, to cause transmission to the dance mat of at least one channel change signal,
wherein the transmission controller circuitry of the dance mat is operative responsive at least in part to the at least one channel change signal, to cause
cessation of transmission of the transmitted signals on a first channel on which the transmission signals are currently transmitted, and
commencement of transmission of the transmitted signals on a second channel, that is different from the first channel, while continuing without lapse the transmission of signals on a uniform periodic time basis and the sequential order.

23. Apparatus comprising:
a base device, wherein the base device is configured to be in wireless communication with at least one remote dance mat, wherein each dance mat is configured to have a respective person dance in contacting engagement therewith,
wherein each dance mat includes
a plurality of pressure sensors, wherein the pressure sensors are operative to sense person contact with an area of the dance mat, a wireless transceiver and transmission controller circuitry,
wherein each dance mat is configured to transmit wireless signals on a uniform periodic time basis and in a sequential order, wherein each wireless signal from a respective dance mat includes data corresponding to pressure being sensed by the at least one of the pressure sensors of the dance mat at the time of signal transmission, and a position of the respective transmitted signal in the respective sequential order of signals transmitted by the respective dance mat,
wherein the base device includes, base device circuitry,
wherein the base device circuitry is operative to
receive the transmitted signals from the at least one dance mat, and responsive to the data corresponding to the position included in the transmitted signals from a respective dance mat, determine when at least one of the signals from the respective dance mat has not been received.

24. The apparatus according to claim 23
wherein the respective dance mat is operative to transmit the transmitted signals on a first wireless channel,
wherein the base unit is operative responsive at least in part to the determination that at least one of the transmitted signals from the respective dance mat has not been received, to send at least one channel change signal to the respective dance mat, wherein the respective dance mat is operative responsive at least in part to receipt of the at least one channel change signal, to cease transmission of the transmitted signals on the first wireless channel and to commence transmission of the transmitted signals on a second wireless channel that is different from the first wireless channel, while continuing without lapse, the transmission of signals on a uniform periodic time basis and the sequential order.

* * * * *